United States Patent Office 3,498,803
Patented Mar. 3, 1970

3,498,803
GLASS OR GLASS-CERAMIC STEAM TREATMENT METHOD AND ARTICLE
Stanley D. Stookey, Corning, N.Y., assignor to Corning Glass Works, Corning, N.Y., a corporation of New York
No Drawing. Filed Apr. 13, 1967, Ser. No. 630,508
Int. Cl. C03c 17/22, 3/30
U.S. Cl. 106—39     7 Claims

ABSTRACT OF THE DISCLOSURE

This invention relates to glass and glass-ceramic articles which exhibit plastic or rubbery properties. More particularly, this invention relates to the manufacture of such products through the treatment with steam of glass and glass-ceramic articles in the alkali silicate composition field.

---

The Ceramic Glossary, compiled by the American Ceramic Society and published in 1963, defines a glass as "an inorganic product of fusion which has been cooled to a rigid condition without crystallization." Hence, glass is generally considered to be a hard, brittle material which is commonly transparent. The conventional glass of commerce exhibits the mechanical properties of a brittle material. At ordinary temperatures it does not demonstrate the property of plastic flow, common to metals, and, consequently, has no yield point. Fracture occurs before there is any permanent deformation of the article and failure always occurs in tension. It also exhibits the property of hardness, i.e., resistance to penetration and abrasion.

A glass-ceramic is a product resulting from the controlled crystallization of a glass article in situ and consists of a myriad of relatively uniformly fine-grained crystals homogeneously dispersed in a glassy matrix, the crystal phase comprising the predominant portion of the article. United States Patents Nos. 2,920,971 and 2,971,853 are representative of two methods by which glass-ceramic articles can be produced. Thus, a glass-forming batch, to which a nucleating agent is generally added, is melted, the melt cooled sufficiently rapidly to form an essentially crystal-free glass body therefrom, and this glass body then heat treated in such a manner as to cause the development of crystals in situ. In the normal practice, the glass body is first heated to a temperature somewhat above its transformation range for a period of time to induce the production of nuclei therein. The body is thereafter heated to a higher temperature (usually above the softening point of the glass) in aorder to cause the growth of crystals on the nuclei. Patent No. 2,920,971 is directed primarily to the use of $TiO_2$ as a nucleating agent, this compound having been found useful in essentially all glass composition systems. Patent No. 2,971,853 is concerned with the use of the photosensitive metals copper, silver, and gold as nucleating agents. In this latter patent, certain alkali metal silicate glass batches containing a very small amount of one of these photosensitive metals are melted and the melt cooled to a glass shape of a desired configuration. The glass shape is then exposed to shortwave radiations, generally in the ultraviolet portion of the spectrum. After irradiation, the glass shape is heat treated in essentially the same maner as described above with respect to Patent No. 2,920,971, the photosensitive metals providing sites for the growth of crystals thereon. The final product is similar in structure to that produced in accordance with the aforementioned patent.

Some glass compositions do not require a nucleating agent, as such, to be included therein to cause the conversion of the glass body to a glass-ceramic product. These glasses, exemplified by United States Patent No. 3,236,662, are termed self-nucleating.

Since a glass-ceramic body is predominantly crystalline, the physical properties exhibited thereby commonly bear a much closer relationship to the crystal phase or phases present than to to the residual glassy matrix. Thus, as is the case with many crystalline solids and with glass, a glass-ceramic article is not subject to the plastic flow of metals and, therefore, has no yield point. Glass-ceramic products are usually stronger mechanically than glasses but, as in glasses, fracture occurs before there is any permanent deformation of the product and failure always takes place in tension. Finally, because these articles comprise a dispersion of crystals in glass, they are free of voids and nonporous.

The two most widely-recognized characteristics of rubbers are their elasticity and flexibility. Thus, an article of rubber can be stretched or compressed and as soon as the applied load is removed, the article will resume its original shape and dimensions. One great advantage inherent in materials which yield under load is their freedom from catastrophic breaks that occur in brittle materials. Rubber is not truly elastic since a certain plastic deformation occurs when a stress is applied thereto and an article does not immediately return to its exact original dimensions after the stress has been released. Closely allied to elasticity is flexibility. A thin sheet of rubber is almost as flexible as a piece of cloth. The rubber is also elastic, however, while the cloth is not.

The property of elasticity correlates those of tensile strength and elongation. The modulus of elasticity (Young's modulus) is measured only within the range of the elastic limit of the substance concerned. Thus, the values are summarized as values of tensile strengths at various elongations. The particular feature of interest in this property is the indication of rubber-like characteristics or resiliency in plastics or rubbers. Whereas the values for glasses are greater than 8,000,000 p.s.i., those for plastics vary from about 60,000 to 4,000,000 p.s.i. with the common rubbers generally ranging between about 1,000,000 to 4,000,000 p.s.i. Young's modulus can be determined by conventional methods and is widely used as a measure of "rubbery" character of a product.

I have discovered that certain compositions of glass and glass-ceramic articles, when treated in a particular manner, will exhibit the elasticity and flexibility and even simulate the tactile quality of rubber. Thus, I have learned that glass bodies within the $Na_2O$–$SiO_2$ and $K_2O$–$SiO_2$ composition systems and glass-ceramic bodies within the $Na_2O$–$SiO_2$, $K_2O$–$SiO_2$, and alkali-$BaO$–$SiO_2$ composition systems can be converted by treatment in a steam atmosphere to bodies exhibiting Young's moduli ranging between about 30,000 and 4,000,000 p.s.i. With respect to the glass-ceramic bodies, operable compositions include those requiring a photosensitive metal as a nucleating agent, those utilizing a nucleating agent other than a photosensitive metal, and those requiring no nucleating agent as such.

Sodium silicate, the conventional waterglass of commerce, is commonly prepared by fusing together mixtures of glass sand and soda ash and, in some instances, by fusing together sand and sodium sulfate reduced simultaneously by admixture with carbon. Glasses consisting of $Na_2O$:$SiO_2$ over a wide range of ratios may be obtained and those glasses containing less $SiO_2$ than the proportion of about $Na_2O$:$4SiO_2$ (about 80 mol percent $SiO_2$) can be dissolved in water. Potassium silicate waterglasses are also known in commerce. I have discovered that certain sodium and potassium silicate glasses having $SiO_2$ contents both greater and less than 80 mol percent $SiO_2$, when suitably treated in a steam atmosphere at an elevated temperature, will not dissolve or leach away but will exhibit rubbery properties.

Glass compositions suitable for carrying out the invention consist essentially, on the oxide basis in mol percent, of about 60–94% $SiO_2$ and 6–40% $R_2O$, wherein $R_2O$ consists of $Na_2O$, $K_2O$ and mixtures thereof. Desirably, the total of the $SiO_2$ and $R_2O$ components constitutes at least about 85 mol percent of the glass composition. Additions of up to about 10 mol percent total of PbO, BaO, and mixtures thereof can be tolerated and, in some instances, serve to improve the chemical durability thereof. The inclusion of other compatible oxides, e.g., ZnO, $B_2O_3$, MgO, and $P_2O_5$, should preferably be held to less than about 10 mol percent total to avoid such adverse side effects as crazing, spalling, spontaneous crystallization, and lack of steam reactivity during steam treatment. CaO and $Li_2O$, if present, are preferably held to less than 5 mol percent. In any event, the addition of more than about 15 mol percent of compatible oxides generally results in glass products not demonstrating the desired rubbery qualities.

Glass-ceramic compositions in the $R_2O$–BaO–$SiO_2$ field which are operable in the invention consist essentially, on the oxide basis in mol percent, of about 60–80% $SiO_2$, 10–35% BaO, and 4–20% alkali metal oxide. Preferably, the total $R_2O+SiO_2+BaO$ constitutes at least about 90 mol percent of the composition. The operable alkali metal oxides include $Na_2O$, $K_2O$, $Rb_2O$, and $Cs_2O$. $Li_2O$ appears to cause the melt to devitrify upon cooling and to inhibit the rubberizing action of steam so, therefore, should be present in less than about 4 mol percent and is preferably absent from the composition. PbO and CdO may be present in amounts up to about 5 mol percent total to modify the properties of the glass-ceramic body, such as improving the chemical durability thereof, but not to deleteriously affect the conversion of the glass-ceramic to a rubbery product. Other compatible metal oxides such as CaO, ZnO, $B_2O_3$, $Al_2O_3$, and MgO may also be advantageously included in amounts totaling about 5 mol percent to influence the glass melting characteristics and the properties of the final glass-ceramic product. The glasses within these composition ranges are self-nucleating but minor amounts of such conventional nucleating agents as fluoride or the photosensitive metals may be included to insure a uniformly fine-grained crystalline body. The manner and amounts of such additions to the glass-forming batches are well-known in the art and comprise no part of this invention.

Where glasses in the $R_2O$–$SiO_2$ composition field are crystallized in situ to glass-ceramic articles, articles exhibiting the best rubbery properties are produced where the $R_2O$ content ranges about 5–30 mol percent and the $SiO_2$ content varies about 70–95 mol percent. In general, the total $R_2O+SiO_2$ constitutes at least 95 mol percent of the glass. These glasses normally utilize a nucleating agent such as has been discussed above to insure the growth of uniformly fine-grained crystallization upon heat treatment. Various compatible metal oxides such as PbO, BaO, CaO, MgO, $B_2O_3$, $Al_2O_3$, and $Li_2O$ are frequently included in the glass in amounts not exceeding about 5 mol percent total in order to improve the melting and forming characteristics of the glass as well as the physical properties of the glass-ceramic article resulting from the crystal phases developed therein.

I have found that the amount of CaO in the glass and glass-ceramic compositions of my invention should be less than about 5 mol percent and is preferably absent, since the development of the desirable rubbery properties appears to be inhibited thereby. Hence, I have learned that the conventional soda lime glasses of commerce, containing from about 5–15 mol percent CaO, are not well-suited for the invention. A little surface reaction is sometimes observed but the product thereof has not the rubbery quality of that developed in low-CaO and CaO-free glasses.

In general, the parameters of the steam treatment procedure are alike whether a glass or a glass-ceramic article is involved. Thus, a glass or a glass-ceramic article is placed in a heating chamber into which steam can be introduced in a volume sufficient to create and maintain an atmosphere of at least 50% by weight and, preferably, essentially 100% by weight steam. For practical reasons, air constitutes that part of the atmosphere other than steam but various inert gases such as helium, argon, nitrogen, carbon dioxide, etc., can be utilized. An autoclave provides a very satisfactory heating chamber since steam under pressure promotes the rapid conversion of the "conventional" glass and glass-ceramic article to the rubbery state although steam at one atmosphere pressure has proven operable. This ability to utilize steam at atmospheric pressure is quite advantageous from a commercial point of view since apparatus for inducing and controlling pressure is not necessary. This, in turn, makes the continuous production of nonporous, rubbery articles from glasses and glass-ceramic relatively simple since some sort of a tunnel or shuttle kiln can be fabricated with entry ports for the introduction of steam therein. Dry steam is preferred, particularly at higher temperatures because of the possibility of dissolving the rubbery layer, but wet steam is also useable.

The glass or glass-ceramic articles are heated in the water vapor or steam atmosphere to a temperature between about 80°–200° C. for a sufficient length of time to transform the glass or glass-ceramic to a rubbery product. The heat to the heating chamber is cut off, the flow of steam stopped, and the article removed when the temperature is at or below 100° C. It can be appreciated that, since the transformation of the article to a rubbery product proceeds from the surface inwards, the required treatment time will depend upon the thickness dimension of the article, the composition being treated, the steam pressure utilized, and the temperature of the treatment. At temperatures much below about 80° C., the conversion to the rubbery state becomes very slow due to the low vapor pressure of water, while at temperatures much above about 200° C. the quality of the product is not significantly better than that obtained at lower temperatures and, sometimes the rubbery product is not sound.

Although it might be expected that immersion in boiling water or in hot water at pressures exceeding one atmosphere would impart the same beneficial effect as steam on these glasses and glass-ceramics, such is not the case. Soaking in water causes the disruption of the surface of the article and leaches out soluble components therefrom such as the alkali metal ions and $B_2O_3$. The resultant product is not the desired nonporous, rubbery article but, rather, consists of a hard glass or glass-ceramic interior with a porous surface layer. In some instances, i.e., where the $SiO_2$ content is less than about 80%, a surface layer may be completely dissolved and removed in the reaction with liquid hot water.

Table I records examples of glass compositions, expressed in mol percent on the oxide basis, operable in this invention. Batches of the proper compositions were compounded from materials, either oxides or other compounds which, on being melted together, are converted to the desired oxide compositions in the proper proportions. The batch ingredients were carefully blended together, usually ballmilled to aid in obtaining a homogeneous melt, and then melted in open platinum or silica crucibles for about 5–6 hours at temperatures between about 1450°–1500° C. In commercial practice, larger melts are made in pots or continuous tanks following conventional glassmaking procedures. The crucible melts were then cooled as a glass by being drawn into cane, ribbon, or fiber or pressed or blown into steel molds. The glass articles were placed in electrically-heated autoclave. Canes about 4″ long and about ¼″ in diameter were generally used. These canes were supported at the ends thereof on refractory bars above the base plate of the autoclave. The autoclave was heated to 120° C. with a steam gauge pressure of about 18 p.s.i., the time taken to reach a steady state operating condition being about 30 minutes. The canes were treated at this temperature and steam pressure for times ranging about ¼–16 hours. The autoclave was then turned off and, after a 20-minute cooling period, the canes were removed therefrom.

For lower-silica glasses consisting of $Na_2O$ and $SiO_2$ only, a reaction time of two hours was sufficient to completely convert the original glass to one exhibiting the properties of rubber. For glasses composed of $K_2O$ and $SiO_2$ only, a reaction time of 3–4 hours was required for complete conversion. The addition of the larger ions barium and lead to the sodium and potassium silicate glasses, or increasing the $SiO_2:R_2O$ ratio in the glass, acted to extend the time required for reaction, e.g., about 4–6 hours, but was beneficial in enhancing the chemical durability of the final rubbery product. Longer steam treatments may be utilized with no noticeable deleterious effect but with no apparent improvement in the rubbery qualities of the resultant article either. Therefore, in the commercial practice of the invention, the minimum time necessary to attain complete conversion of a glass article of certain thickness dimensions to one exhibiting properties akin to rubber is determined empirically and this schedule then adhered to so long as articles of the same thickness dimensions are being produced. A change in dimensions normally requires a change in treatment schedule.

TABLE I

|  | 1 | 2 | 3 | 4 | 5 | 6 | 7 | 8 |
|---|---|---|---|---|---|---|---|---|
| $SiO_2$ | 74 | 72 | 72 | 74.5 | 73.6 | 73.8 | 76.0 | 76.0 |
| $Na_2O$ | 26 | 28 |  |  |  | 13.8 |  | 24.0 |
| $K_2O$ |  |  | 23 | 21.3 | 26.4 | 12.4 | 17.9 |  |
| $PbO$ |  |  |  |  |  |  | 6.1 |  |
| $BaO$ |  |  | 5 | 4.2 |  |  |  | 2 |
| Treating time (hrs.) | 2 | 2 | 6 | 6 | 4 | 3 | 16 | 2 |

Table II records glass compositions which were melted and shaped in like manner to those examples set out in Table I but the glass canes were treated at temperatures between 80°–120° C. with steam at atmospheric pressure rather than utilizing the pressure system of an autoclave. The atmosphere was essentially 100% water vapor.

TABLE II

|  | 9 | 10 | 11 | 12 | 13 | 14 | 15 | 16 | 17 |
|---|---|---|---|---|---|---|---|---|---|
| $SiO_2$ | 70.2 | 82.4 | 84.0 | 73.1 | 66.4 | 90 | 83.3 | 76.0 | 63.8 |
| $K_2O$ | 29.8 | 17.6 | 13.0 | 20.3 | 27.1 | 10 | 15.7 | 17.2 | 32.6 |
| $PbO$ |  |  |  | 6.5 |  |  | 1.0 | 6.8 | 3.6 |
| $BaO$ |  |  | 3.0 |  | 6.6 |  |  |  |  |
| Treating time (hrs.) | 5 | 4 | 5 | 8 | 16 | 3 | 4 | 15 | 16 |
| Treating temperature (deg.) | 120 | 100 | 100 | 120 | 80 | 120 | 120 | 100 | 80 |

|  | 18 | 19 | 20 | 21 | 22 | 23 | 24 | 25 | 26 |
|---|---|---|---|---|---|---|---|---|---|
| $SiO_2$ | 70 | 63.3 | 63.9 | 78 | 78.9 | 71.9 | 66.4 | 92 | 94 |
| $Na_2O$ | 30 | 24.7 | 31.9 | 22 | 20.2 | 22.8 | 31.6 | 8 | 6 |
| $K_2O$ |  |  |  |  |  |  |  |  |  |
| $PbO$ |  |  |  |  | 0.9 | 5.2 | 2.0 |  |  |
| $BaO$ |  | 12.0 | 4.2 |  |  |  |  |  |  |
| Treating time (hrs.) | 2 | 8 | 6 | 3 | 5 | 8 | 6 | 16 | 16 |
| Treating temperature (deg.) | 120 | 100 | 100 | 120 | 120 | 120 | 120 | 120 | 120 |

My Patents Nos. 2,515,939, 2,515,940, and 2,515,941 describe the production of photosensitive opal glasses from compositions in the alkali silicate and alkali barium silicate fields. These patents disclose the utility of the photosensitive metals copper, gold, and silver (0.1–1.0 weight percent copper computed as $Cu_2O$, 0.001–0.05 weight percent Au, and 0.001–0.2 weight percent silver computed as AgCl) in developing nuclei for the subsequent growth of sufficient crystallization thereon during a controlled heat treatment of the glass to render the glass translucent or opaque.

Hence, Patent No. 2,515,941 describes the production of a photosensitive opal glass from alkali barium silicate compositions containing gold as a nucleating agent. The batches are melted and cooled to a glass. The glass is then exposed to ultra-violet radiations and thereafter heated to a temperature of about 100° C. less than the softening point of the glass to cause the growth of barium disilicate crystals on colloidal gold nuclei.

Patents Nos. 2,515,943, 2,628,160, and 2,651,145 disclose the use of the photosensitive metals silver and gold in the production of opal glasses as nucleating agents in conjunction with alkali fluorides (about 2–5 mol percent $F_2$). Thus, a glass-forming batch containing one of the photosensitive metals (0.0001–0.3 weight percent silver computed as AgCl and 0.001–0.01 weight percent Au) and an alkali fluoride is melted and cooled to a glass. The glass is first exposed to ultraviolet radiations and then subjected to a two-step heat treatment. The irradiated article is subsequently heated to a temperature somewhat above the annealing point of the glass to cause the formation of submicroscopic nuclei of colloidal metal particles. The article is then cooled to at least below 500° C. and, finally, reheated to temperatures around 100° C. below the softening point of the glass. The cooling step is believed to cause the formation of alkali fluoride nuclei on the colloidal metal nuclei and the reheating leads to the growth of the light diffusing alkali fluoride crystals in these nuclei.

These types of opal glasses as well as other conventional opal glasses having compositions encompassed within the above-cited operable ranges are deemed to be included within my invention. Table III lists two examples, in mol percent, which are illustrative of these photosensitive opal glasses. Other examples can be found in the above-cited patents which have compositions falling within the glass ranges of my invention. (The amounts of gold, $CeO_2$, present as a sensitizer, and $Sb_2O_3$, present as a fining agent, are so small that they are considered as being in excess of the base glass constituents.)

TABLE III

|  | 27 | 28 |
|---|---|---|
| $SiO_2$ | 75.0 | 76.5 |
| $Na_2O$ | 14.1 | 19.7 |
| $K_2O$ | 7.2 |  |
| $Al_2O_3$ | 0.5 | 0.5 |
| $F_2$ | 3.2 | 3.3 |
| Au | 0.003 | 0.003 |
| $CeO_2$ | 0.02 | 0.02 |
| $Sb_2O_3$ | 0.1 | 0.1 |

The batches for these two examples were melted at 1550° C. for five hours and glass sheet of about 3/16″ thickness was drawn from the melt and annealed at about 480° C. Bars about 3/16 x 3/16 x 4 inches were cut from this sheeting. These bars were first exposed for about 16 minutes to an 800 watt high pressure mercury arc lamp produced by General Electric Company after which they were heated to 550° C., held thereat for four hours, and then cooled to room temperature. Thereafter, the bars were heated to 650° C., maintained thereat for two hours, and then cooled to room temperature. The rates of heating and cooling the glass are not critical but must not be so rapid as to cause breakage or cracking due to thermal shock. The resultant bars were substantially opaque due to the crystallization of alkali fluoride with a minor amount of cristobalite developed therein. Each opacified bar was transformed to a rubbery product by a 16-hour treatment in an autoclave operating at 120° C. under a gauge pressure of 18 p.s.i., the atmosphere therein being essentially 100% steam.

It can be appreciated that the production of these photosensitive opal glasses permits the formation of articles which are rubbery throughout and contain dispersed crystals. This permits photographic control of the physical properties.

Tables IV–VIII record examples of glass-ceramic compositions, expressed in mol percent on the oxide basis, which form desirable rubbery products when treated in accordance with the method of this invention. Batches of the proper composition were carefully mixed together, ball-milled to aid in obtaining a homogeneous melt, and then melted in open platinum crucibles at temperatures between about 1450°–1600° C. for about 5–6 hours. The melts were cooled to glass bodies by being drawn into cane, rolled into sheeting, or pressed into steel molds. The glass bodies were converted into glass-ceramic articles through heat treatment, a preliminary exposure to short wave radiation, commonly ultraviolet radiation, being required where a photosensitive metal was utilized as a nucleating agent. Canes of round cross-section about 4″ long and about ¼″ in diameter and bars about 4″ long and about ¼″ square cross section were used for testing purposes. Like the glass bars tested above, these glass-ceramic canes and bars were supported at the ends thereof on refractory elements above the base plate of an autoclave. The autoclave was then heated to about 80°–120° C. with, optionally, a steam gauge pressure of about 18 p.s.i. at 120° C., a steady state operating condition being reached in about 30 minutes. The bars and canes were maintained at these temperatures and pressures for periods of time ranging from about 4–16 hours. The heat and the steam pressure, where utilized, were cut off and, after a cooling period of 20 minutes, the treated canes and bars were removed from the autoclave.

As was explained above with respect to the rubbery glasses, the reaction of the glass-ceramic with steam likewise proceeds from the surface of the article inward. Therefore, of course, the period of time necessary to completely transform the original glass-ceramic body into one exhibiting physical properties akin to those of rubber depends upon the thickness dimension of the article. For glass-ceramic articles in the $R_2O$–$SiO_2$ composition field with steam under pressure, a treatment time of about 3–4 hours is required to completely convert a ¼″ diameter cane to a rubbery product. The $R_2O$–$BaO$–$SiO_2$ compositions appear to take a somewhat longer time, usually about 5–6 hours. The addition of the various compatible metal oxides disclosed above to the base glass compositions can alter this rate of transformation. Much longer steam treatment times than those cited above can be employed with no substantial deleterious effect upon the final rubbery product but with no apparent advantage either. Hence, the minimum time required to attain the total conversion of a glass-ceramic article of a specific thickness to a rubbery body must be determined empirically. Thus, a change in glass composition, the temperature, concentration, and pressure of the steam utilized, or a change in the thickness dimension usually necessitates a modification in the treating time. Nevertheless, this determination of the proper steam treating schedules is well within the manipulative techniques of one skilled in the art.

Table IV records glass-ceramic compositions, in mol percent as calculated from the batch, which utilized alkali metal fluoride as the nucleating agent in the crystallization of the glass to a glass-ceramic. The table also reports the times and temperatures employed in melting the individual glass batches. The heat treatment schedule for converting ¼″ diameter cane of Examples 29, 30, and 31 to glass-ceramic cane comprises heating the glass cane in a laboratory furnace at the rate of 3° C./minute to 900° C., holding thereat for one hour, and then cooling to room temperature. The heat treatment schedule for transforming ¼″ diameter cane of Examples 32, 33, and 34 to glass-ceramic cane consisted of heating the glass cane in a laboratory furnace at the rate of 3° C./minute to 700° C., maintaining thereat for one hour, and then cooling to room temperature. The heat treatment for the conversion of ¼″ cane of Example 35 to glass-ceramic cane comprised heating the glass cane at 3° C./minute to 900° C., holding thereat for six hours, and then cooling to room temperature. Each of the cane was thereafter placed in an autoclave and heated to 120° C. in an essentially 100% steam atmosphere for four hours, the steam being at a gauge pressure of 18 p.s.i.

The products resulting from steam treating the glass-ceramic articles having the compositions recited in Table IV contain very fine-grained crystals of quartz and/or tridymite and/or cristobalite dispersed relatively uniformly in a rubbery matrix. Hence, these products exhibit the desirable properties of increased strength and stiffness which are similarly imparted to rubber products through the addition of fillers thereto.

The rubbery articles display varying combinations of strength, Young's modulus, and impact resistance depending upon the composition thereof, the heat treatment employed in converting the glass to a glass-ceramic body, and the steam treatment applied to the glass-ceramic article.

TABLE IV

|  | 29 | 30 | 31 | 32 | 33 | 34 | 35 |
|---|---|---|---|---|---|---|---|
| $SiO_2$ | 82.6 | 83.6 | 85.0 | 75.5 | 75.3 | 74.9 | 90.0 |
| $Na_2O$ | 12.1 | 8.6 | 8.3 | 19.3 | 19.7 | 20.2 | 5.6 |
| $K_2O$ |  | 2.4 | 1.3 |  |  |  |  |
| $Al_2O_3$ |  |  |  | 0.6 | 0.5 | 0.5 |  |
| $F_2$ | 5.3 | 5.4 | 5.4 | 4.6 | 4.5 | 4.4 | 4.4 |
| Melt temp. °C | 1,500 | 1,500 | 1,500 | 1,450 | 1,450 | 1,450 | 1,450 |
| Melt time (hrs.) | 5 | 5 | 5 | 5 | 5 | 5 | 5 |

When fluoride is dissolved in the melt in high concentrations, i.e., greater than about 7 mol percent, alkali metal fluorides (generally NaF in the glasses of Table IV) precipitate as the melt cools to a glass. This condition is normally not desirable because it can lead to uneven and premature crystallization of silica, with consequent difficulty in forming shapes therefrom.

At intermediate levels of fluoride, i.e., about 4½–7 mol percent, the alkali metal fluorides precipitate only at relatively low temperatures (below about 600° C.) on cooling, or on subsequent reheating. Beta-cristobalite forms next and it is altered to tridymite above 900° C., quartz at 800° C., or alpha-cristobalite on cooling. Examples 29–35 fall within this level of fluoride. Alpha-cristobalite comprised the principal crystal phase in the products of Examples 29–34 while tridymite constituted the principal crystal phase in Example 35 with alpha-cristobalite being also present in minor amounts.

At still lower fluoride concentrations, the alkali metal fluorides precipitate only on colloidal metal nuclei of such metals as gold, silver, and copper. Hence, a glass-ceramic article can be made in low-fluoride glasses by incorporating one of these metals plus a thermoreducing agent such as $Sb_2O_3$ to reduce the metal to a colloidal precipitate. Table V records glass-ceramic compositions, in mol percent as calculated from the batch, of this type and the times and temperatures utilized in melting the individual glass batches.

The heat treatment schedule for converting ¼″ diameter glass cane of Examples 36–38 to alpha-cristobalite-containing glass-ceramic cane comprised heating the cane in a laboratory furnace at the rate of 3° C./minute to 700° C., maintaining this temperature for 1 hour, and then cooling to room temperature. The crystallization treatment for converting ¼″ diameter glass cane of Examples 39–40 to glass-ceramic cane containing alpha-cristobalite as the principal crystal phase consisted of heating the cane at 3° C./minute to 550° C., maintaining thereat for ½ hour, thereafter raising the temperature at 30 C./minute to 750° C., holding thereat for ½ hour, and, finally, cooling to room temperature. Each of the crystallized cane was placed in an autoclave in the manner described above with respect to the other examples and heated to 120° C. in an atmosphere of essentially 100% steam for the periods of time recorded in Table V, the steam being at a gauge pressure of 18 p.s.i. The gold and the $CeO_2$ added to promote the action of the gold are present in such small amounts that they are merely reported in weight percent in excess of the base glass.

TABLE V

|  | 36 | 37 | 38 | 39 | 40 |
|---|---|---|---|---|---|
| $SiO_2$ | 72.6 | 73.2 | 79.1 | 79.7 | 83.6 |
| $Na_2O$ | 22.2 | 22.4 | 16.5 | 16.7 | 12.9 |
| $Al_2O_3$ | 0.6 | 0.5 | 0.5 | 0.5 | 0.5 |
| F | 4.5 | 3.8 | 3.8 | 3.0 | 2.9 |
| $Sb_2O_3$ | 0.1 | 0.1 | 0.1 | 0.1 | 0.1 |
| Au | 0.007 | 0.007 | 0.007 | 0.008 | 0.007 |
| $CeO_2$ | 0.032 | 0.032 | 0.032 | 0.032 | 0.032 |
| Melt temp. (° C.) | 1,550 | 1,550 | 1,550 | 1,550 | 1,550 |
| Melt time (hrs.) | 5 | 5 | 5 | 5 | 5 |
| Autoclave (hrs.) | 16 | 4 | 4 | 18 | 18 |

Table VI lists the compositions, in mol percent as calculated from the batch, of several alkali barium silicate glasses which employ colloidal metal nuclei and a thermoreducing agent in their conversion to glass-ceramic products and the temperatures and times utilized in melting each batch. The heat treating schedule for converting ¼" diameter glass cane of Examples 41–42 to glass-ceramic cane containing $BaO \cdot 2SiO_2$ as the principal crystal phases consisted of heating the glass cane in a laboratory furnace at 3° C./minute to 750° C., holding this temperature for four hours, and then cooling to room temperature. The crystallization schedule for transforming ¼" diameter glass cane of Example 43 to glass-ceramic cane containing a barium silicate as the predominant crystal phase comprised heating the cane at 3° C./minute to 750° C., maintaining the cane thereat for two hours, thereafter raising the temperature at 3° C./minute to 800° C., holding this temperature for two hours, and then cooling to room temperature. The heat treatment cycle for converting ¼" diameter glass cane of Examples 44–45 to glass-ceramic cane containing a barium silicate as the principal crystal phase consisted of heating the glass cane at 3° C./minute to 700° C., maintaining this temperature for one hour, and then cooling to room temperature.

All of the glass-ceramic canes were placed in an autoclave and heated to 120° C. in an atmosphere of essentially 100% steam. The canes were held within the autoclave for four hours, the steam being at a gauge pressure of 18 p.s.i. The transformation of the canes to rubbery products was not complete so other canes of these examples were heated in an autoclave operating at atmospheric pressure at 120° C. for 16 hours utilizing an atmosphere of essentially 100% steam. The transformation of the glass-ceramic canes to canes exhibiting rubbery products throughout the mass thereof was then virtually complete.

As was the case with Examples 36–40 of Table V, the amounts of gold and $CeO_2$ added to the base compositions of Examples 41–45 are so small that they are merely reported in weight percent in excess of the base glass constituents.

TABLE VI

|  | 41 | 42 | 43 | 44 | 45 |
|---|---|---|---|---|---|
| $SiO_2$ | 70.2 | 66.9 | 65.8 | 64.7 | 57.7 |
| BaO | 17.2 | 21.9 | 25.0 | 22.2 | 28.3 |
| $Na_2O$ | 6.2 | 6.5 |  | 13.0 | 13.9 |
| $K_2O$ | 5.9 | 4.4 | 8.9 |  |  |
| $Sb_2O_3$ | 0.5 | 0.3 | 0.3 | 0.1 | 0.1 |
| Au | 0.007 | 0.007 | 0.007 | 0.007 | 0.007 |
| $CeO_2$ | 0.032 | 0.032 | 0.032 | 0.017 | 0.016 |
| Melt temp. (° C.) | 1,450 | 1,450 | 1,450 | 1,500 | 1,500 |
| Melt time (hrs.) | 6 | 6 | 6 | 5 | 5 |

Table VII records the compositions of several alkali barium silicate glasses, in mol percent as calculated from the batch, which do not employ a nucleating agent as such in their crystallization in situ to glass-ceramic articles along with the temperatures and times utilized in melting the batches. The heat treating schedule for crystallizing ¼" diameter glass cane of Examples 46–47 to glass-ceramic cane containing $BaO \cdot 2SiO_2$ and/or $2BaO \cdot 3SiO_2$ as the predominant crystal phases comprising heating the cane in a laboratory furnace at 5° C./minute to 700° C., mintaining this temperature for two hours, thereafter raising the temperature at 5° C./minute to 860° C., holding the cane thereat for six hours, and then cooling to room temperature. The heat treatment for crystallizing ¼" diameter glass cane of Example 48 to glass-ceramic cane containing a barium silicate as the principal crystal phase consisted of heating the cane at 3° C./minute to 550° C., maintaining this temperature for one hour, thereafter raising the temperature at 3° C./minute to 650° C., holding the cane thereat for one hour, then heating at 3° C./minute to 700° C., maintaining thereat for ½ hour, and, finally, cooling to room temperature.

Each glass-ceramic cane was placed in an autoclave and heated to 120° C. in an atmosphere of essentially 50% steam-50% air for 16 hours, the autoclave being operated at a gauge pressure of 18 p.s.i.

TABLE VII

|  | 46 | 47 | 48 |
|---|---|---|---|
| $SiO_2$ | 66.4 | 64.7 | 55.4 |
| BaO | 28.9 | 28.1 | 24.4 |
| $Na_2O$ |  | 7.2 | 9.6 |
| $K_2O$ | 4.7 |  | 10.6 |
| Melt temp. (° C.) | 1,600 | 1,600 | 1,500 |
| Melt time (hrs.) | 6 | 6 | 5 |

It is also possible to produce glass-ceramic products which can be steam treated to exhibit rubbery properties from alkali silicate and alkali barium silicate glasses within the composition ranges cited above by incorporating one of the photosensitive metals copper, silver, and gold into the batch. After the batch has been melted and a glass article shaped from the melt, the glass article is exposed to short wave radiations and then heat treated. The short wave radiations cause the development of colloidal metal particles of the above-named photosensitive metals which act as nuclei for the growth of crystals which takes place during the heat treatment. My Patent No. 2,971,853 is illustrative of this procedure.

Table VIII lists several compositions, in mol percent as calculated from the batch, of alkali barium silicate glasses wherein gold is incorporated as the photosensitive metal. $CeO_2$ is included as a sensitizing agent for the gold. In common with the examples recorded in Tables V and VI, the amounts of Au and $CeO_2$ present are so small that these components are reported in weight percent in excess of the base glass constituents. Each batch was melted at 1500° C. for five hours. The process for crystallizing ¼" diameter glass cane into glass-ceramic cane containing a barium silicate as the predominant crystal phase comprised first exposing the glass cane to an 800-watt high pressure mercury lamp produced by the General Electric Company for ½ hour after which the cane was heated at 3° C./minute to 700° C., maintained at that temperature for 16 hours, and then cooled to room temperature. Each cane was completely transformed to a rubbery product by a 16 hour treatment in an autoclave operating at 120° C. at a steam gauge pressure of 18 p.s.i., the atmosphere being essentially 100% steam.

The use of a photosensitive metal for a nucleating agent, as is well-known in the prior art, enables the differential production of crystallized areas in a glass article. This feature, then, permits the production of glass-ceramic products wherein certain areas only exhibit rubbery properties, since a glass not susceptible to the formation of a rubbery product through steam treatment could be crystallized in certain areas wherein the glassy matrix would have a composition applicable to the steam treating process of the invention.

TABLE VIII

|  | 49 | 50 | 51 |
|---|---|---|---|
| $SiO_2$ | 70.0 | 67.9 | 68.5 |
| $Na_2O$ | 6.2 | -------- | 6.3 |
| $K_2O$ | 9.8 | 13.9 | 9.9 |
| $BaO$ | 13.9 | 18.1 | 15.2 |
| $Sb_2O_3$ | 0.1 | 0.1 | 0.1 |
| $Au$ | 0.007 | 0.007 | 0.007 |
| $CeO_2$ | 0.033 | 0.033 | 0.032 |

Another modification of the utility of the photosensitive metals gold and silver as nucleating agents in the production of glass-ceramic articles contemplates their use in conjunction with alkali fluorides. In my Patent Nos. 2,515,943 and 2,651,145 there is disclosed the production of high-silica opal glasses employing this technique and, with a high temperature heat treatment, a highly crystalline article, i.e., a glass-ceramic, can be obtained. Thus, after the glass-forming batch has been melted and a glass article shaped from the melt, the article is first exposed to short wave radiations and then subjected to a two-step heat treatment. After irradiation, the article is heated to a temperature somewhat above the annealing point of the glass. This step is believed to cause the development of submicroscopic nuclei of colloidal metal particles. The article is thereafter cooled to at least below 500° C. and then reheated to temperatures approaching and/or exceeding the softening point of the glass. This heat treating cycle involves the formation of alkali fluoride nuclei on the photosensitive metal nuclei during the cooling with the growth of these fluorides and subsequent crystallization of silica thereon as the article is reheated. Examples 52–53 of Table IX are illustrative of this type of nucleation and crystallization.

The batches for these two examples, expressed in mol percent on the oxide basis, the gold and $CeO_2$ being recorded in weight percent in excess of the base glass, were melted for five hours at 1550° C. and glass sheet of about 4″ width and 3/16″ thickness was drawn. Glass bars 3/16″ x 3/16″ x 4″ were cut from this sheeting which had been annealed at 480° C. These bars were first exposed to the same 800-watt high pressure mercury arc lamp noted above with respect to the examples in Table VIII for 16 minutes after which the bars were heated at about 3° C./minute to 550° C., held thereat for four hours, and then cooled to room temperature by removing the bars from the furnace. Thereafter, the bars were heated at about 3° C./minute to 900° C., maintained at this temperature for two hours to develop a high degree of crystallization therein, and then cooled to room temperature by removal from the furnace into the ambient atmosphere. The heating and cooling rates are not critical since the only requirement therefor is that they not be so rapid as to cause breaking or cracking due to thermal shock.

Each crystallized bar was transformed throughout to a rubber product by a 16 hour treatment in an autoclave operating between 80°–120° C. and at a gauge pressure of 18 p.s.i., the atmosphere therein being essentially 100% steam.

TABLE IX

|  | 52 | 53 |
|---|---|---|
| $SiO_2$ | 75.2 | 77.2 |
| $Na_2O$ | 13.8 | 18.9 |
| $K_2O$ | 7.2 | -------- |
| $Sb_2O_3$ | 0.1 | 0.1 |
| $Al_2O_3$ | 0.6 | 0.5 |
| $F_2$ | 3.1 | 3.3 |
| $Au$ | 0.005 | 0.005 |
| $CeO_2$ | 0.03 | 0.03 |
| Autoclave (° C.) | 80 | 120 |

A very narrow range of these photosensitive alkali silicate glasses nucleated by gold or silver and alkali fluoride demonstrates the unique ability to be made differentially water soluble such that shapes thereof can be chemically sculptured. Hence, alkali silicate glasses containing about 78–85 mol percent $SiO_2$ and 13–19 mol percent $R_2O$ plus suitable amounts of fluorine (about 2–5 mol percent $F_2$) and gold or silver (about 0.001–0.01 weight percent Au and 0.001–0.3 weight percent silver computed as AgCl), wherein the alkali metal is $Na_2O$ and/or $K_2O$ are operable. Following the usual exposure to ultra-violet radiations, the glasses are heat treated in the range of about 500°–600° C. to induce nucleation of the photosensitive metal and alkali fluoride crystals, and then heated to temperatures approaching and/or exceeding the softening point of the glass. Table X records three examples of these products.

TABLE X

|  | 54 | 55 | 56 |
|---|---|---|---|
| $SiO_2$ | 79.85 | 81.95 | 81.10 |
| $Na_2O$ | 16.80 | 15.10 | 15.95 |
| $Al_2O_3$ | 0.60 | 0.50 | 0.50 |
| $F_2$ | 2.70 | 2.40 | 2.40 |
| $Sb_2O_3$ | 0.05 | 0.05 | 0.50 |
| $CeO_2$ | 0.03 | 0.03 | 0.03 |
| $Au$ | 0.007 | 0.007 | 0.006 |

Similarly to the examples set out in Table IX, the batches for these glasses, expressed in mol percent on the oxide basis, the Au and $CeO_2$ reported in weight percent in excess of the base glass, were melted for five hours at 1550° C. and glass sheet of about 4″ width and 3/16″ thickness drawn. The sheets were first exposed to the same 800-watt high pressure mercury arc lamp described above with respect to the examples in Tables VIII and IX for 30 minutes in the conventional manner through a suitable photographic negative having the desired design. Thereafter, the sheets were heated at about 3° C./minute to 550° C., maintained thereat for 30 minutes, and then cooled to room temperature. Examples 54 and 55 were subsequently heated at about 3° C./minute to 750° C., held thereat for 30 minutes to develop the desired crystallization therein, and then cooled to room temperature. Example 56 was heated at about 3° C./minute to 650° C., held thereat for 4 seconds to grow the desired crystallization, and then cooled to room temperature. This procedure resulted in the development of cristobalite crystals in those areas exposed to the ultraviolet radiation. Thus, the residual glass in the exposed (crystallized) areas is lower in silica content than the unexposed glass and is, therefore, very susceptible to steam treatment.

Examples 54 and 55 were thereafter placed in an autoclave operating at 120° C. and at a gauge pressure of 18 p.s.i. and treated therein for 18 hours, the atmosphere being essentially 100% steam. Example 56 was treated for 16 hours in an autoclave operating at 80° C. and at a gauge pressure of 18 p.s.i., the atmosphere being essentially 100% steam. The exposed areas exhibited rather complete reaction to the steam being essentially rubbery throughout while the unexposed areas were only slightly affected. Where only a surface reaction is desired to give, e.g., an intaglio design, much shorter exposure times are suitable—perhaps as little as ¼ hour will be sufficient. If the unexposed glass shows any substantial reaction to the steam treatment, a means for masking this area can be devised to shield against steam impingement.

Examples 54 and 55 were then immersed for one hour in boiling water and Example 56 placed in a stream of hot tap water for one hour. In each instance, the exposed areas were etched away by the water while the unexposed areas were essentially unaffected. Where a more rapid etch is desired, hot alkaline solutions can be utilized. This preferential etching enables the production of glass bodies having very intricate designs carved therein. If desired, the sculptured glass body can subsequently be converted to a glass-ceramic by being subjected to the above-recited exposure and heat treating steps.

It will be understood that the above examples of glass-ceramic bodies which are operable in this invention are merely illustrative and not limiting. The processes by which glasses within the critical composition ranges can be converted to glass-ceramic articles form no part of the instant invention since the manner of heat treatment and the utility and identity of nucleating agents is well known in the art. The present invention resides in the steam treatment of glass-ceramic articles having compositions falling within specified ranges.

The glass and glass-ceramic products exhibiting rubbery properties produced from my process have been analyzed and determined to contain water as an integral component. This water content ranges from about 5–30 weight percent in the glass articles to about 2–15 weight percent in the glass-ceramic bodies, it being appreciated that this difference is due to the fact that essentially only the glassy matrices of the glass-ceramic bodies are reactive with the steam. Analyses of the rubbery glasses, then, report a proportionate reduction of about 5–30 weight percent in the amounts of the constituents present in the base glass whereas analyses of the rubbery glass-ceramic articles indicate a proportionate reduction of about 2–15 weight percent in the quantities of the components present in the base glass. It is this presence of water, assumed to be dispersed molecularly in the glass network since the articles are nonporous, which I believe to be responsible for the rubbery character of the steam treated materials.

I have discovered that the rubbery properties developed in glasses and glass-ceramics through the steam treatment of this invention provide the basis for another group of useful products. I have observed that glass and glass-ceramic articles having the compositions recited above can be made which will exhibit very high mechanical strengths when treated according to the method of this invention but where the treatment is carried only so far as to produce a nonporous, rubbery surface layer, i.e., the steam treatment is not carried out for a sufficiently long period of time that the rubbery character is imparted throughout the thickness dimension of the article.

The strength of glass having an undamaged fresh surface is very high as has been demonstrated by modulus of rupture measurements of several hundred thousand p.s.i. on freshly drawn glass fibers and rods. In actual practice, however, the strength of ordinary commercial glassware ranges between about 5000–8000 p.s.i. depending upon the type of glass involved, the method of its production, and the nature of any subsequent handling.

I have learned that when lengths of cane made from the glass compositions recited in Tables I and II are treated in accordance with the method of this invention but wherein the conversion of the "conventional" glass was limited to a surface layer thereof such that a core of substantial thickness dimension of original glass remained, these composite canes exhibited modulus of rupture values ranging about 80,000–250,000 p.s.i. This marked improvement in strength is believed to be due to a simultaneous polishing action and formation of a low elastic modulus protective skin. Also, glass tumblers made from the same glasses and steam-treated in the same way exhibited greatly increased impact strength compared to ordinary glass tumblers.

I have learned, however, that the amount of CaO in the glass composition should be limited to less than about 5 mole percent if very high strength articles are to be attained. Conventional soda lime glasses are described in United States Patent No. 3,275,470 as being strengthened through the steam treatment thereof. I have found that the reaction layer, which is sometimes produced on the surface of such glasses through treatment in accordance with that patent, does not have the rubbery character of the low-CaO and CaO-free glasses of my invention and the improvement in strength, where found, does not aproach the values exhibited by the products of my invention.

In glass-ceramic articles wherein the steam treatment is carried only so far as to produce a rubbery surface layer thereon, much improved resistance to impact has been observed. Such products have the high intrinsic strength of the glass-ceramic core surrounded with a rubbery surface layer which acts to cushion blows received by the article in service.

The depth of this surface layer on the glass and glass-ceramic articles of this invention depends, of course, upon the composition of the article and the time, temperature, and steam pressure of the steam treating step. In general, this rubbery surface layer should have a depth of at least about 0.1 mm. and, preferably, 1 mm. to have a substantial effect and to insure the relative permanence of the high strength. This depth is necessary to forestall injury thereto resulting from abrasion concomitant with normal handling of the article. Commonly a treating time of at least ¼ hour is required to achieve a depth of 1 mm. Thus, very strong potassium silicate glass rods of ¼″ diameter have been obtained from Example 9 after a treatment of about one hour at 120° C. with steam at one atmosphere pressure, the depth of the layer being approximately 1 mm. The treatment of the same glass under equivalent conditions for 15 minutes yielded a rubbery surface layer of about ½ mm.

The uses for the steam-treated glasses of this invention are many. For example, steam-treated ribbon has a combination of valuable properties that make it unique and suitable for many purposes. These properties include: high strength, adhesive character, dimensional stability, and gas impermeability which plastics do not have, and low elastic modulus. Likewise, steam-treated fibers of these glasses provide excellent reinforcements for certain organic plastics and rubbers and for the thermoplastic materials and hydraulic cements disclosed in patent application, Ser. No. 630,537, filed concurrently with the instant application by H. L. Bickford, L. G. Sawchuk, and S. D. Stookey when embedded therein.

Since the rubbery character of the products of this invention is the result of water dispersed molecularly in the glass network, to insure lasting protection from the water drying out of the surface of these products a water-imervious coating or covering may advantageously be applied thereto.

I claim:
1. An article having at least a surface portion which is nonporous and exhibits rubber-like characteristics comprising a body selected from the group consisting of an alkali silicate glass and a glass-ceramic having a composition selected from the group consisting of alkali silicates and alkali barium silicates wherein:
   (a) at least a surface portion of said glass body contains within its volume about 5–30% by weight of water and said glass body consists essentially, in mol percent on the oxide basis, exclusive of water contained within its volume, of about 60–94% $SiO_2$ and 6–40% $R_2O$, wherein $R_2O$ consists of $Na_2O$, $K_2O$, and mixtures thereof, the total of $SiO_2$ and $R_2O$ constituting at least about 85 mol percent of the glass composition, and less than about 5% CaO;
   (b) at least a surface portion of said alkali silicate glass-ceramic contains within its volume about 2–15% by weight of water and said glass-ceramic consists essentially, in mol percent on the oxide basis, exclusive or water contained within its volume, of about 70–95% $SiO_2$ and 5–30% $R_2O$, wherein $R_2O$ consists of $Na_2O$, $K_2O$, and mixtures thereof, the total of $SiO_2$ and $R_2O$ constituting at least about 95 mol percent of the glass-ceramic composition; and
   (c) at least a surface portion of said alkali barium silicate glass-ceramic contains within its volume about 2–15% by weight of water and said glass-ceramic consists essentially, in mol percent on the oxide basis, exclusive of water contained within its volume, of about 60–80% $SiO_2$, 10–35% BaO, and 4–20% $R_2O$, wherein $R_2O$ consists of $Na_2O$, $K_2O$, $Rb_2O$, $Cs_2O$, and mixtures thereof, the total of $SiO_2$, BaO, and $R_2O$ constituting at least about 90 mol percent of the glass-ceramic composition, and less than about 5% CaO.

2. A method for making an article having at least a surface portion that is nonporous and exhibits rubber-like characteristics which comprises exposing a body selected from the group consisting of an alkali silicate glass and a glass-ceramic having a composition selected from the group consisting of alkali silicates and alkali barium silicates to a gaseous environment containing at least 50% by weight steam at a pressure of at least about one atmosphere and a temperature between about 80–200° C. for a period of time sufficient to develop at least a surface portion in said glass body that contains within its volume about 5–30% by weight of water and at least a surface portion in said glass-ceramic body that contains within its volume about 2–15% by weight of water, said alkali silicate glass consisting essentially, in mol percent on the oxide basis, exclusive of water contained within its volume, of about 60–94% $SiO_2$ and 6–40% $R_2O$ wherein $R_2O$ consists of $Na_2O$, $K_2O$, and mixtures thereof, the total of $SiO_2$ and $R_2O$ constituting at least about 85 mol percent of the glass composition, and less than about 5% CaO, said alkali silicate glass-ceramic consisting essentially, in mol percent on the oxide basis, exclusive of water contained within its volume, of about 70–95% $SiO_2$ and 5–30% $R_2O$, wherein $R_2O$ consists of $Na_2O$, $K_2O$, and mixtures thereof, the total of $SiO_2$ and $R_2O$ constituting at least about 95 mol percent of the glass-ceramic composition, and said alkali barium silicate glass-ceramic consisting essentially, in mol percent on the oxide basis, exclusive of water contained within its volume, of about 60–80% $SiO_2$, 10–35% BaO, and 4–20% $R_2O$, wherein $R_2O$ consists of $Na_2O$, $K_2O$, $Rb_2O$, $Cs_2O$, and mixtures thereof, the total of $SiO_2$, BaO, and $R_2O$ constituting at least about 90 mol percent of the glass-ceramic composition and less than about 5% CaO.

3. A method according to claim 2 wherein the time sufficient to develop said water-containing surface portion is at least about ¼ hour.

4. A method for chemically sculpturing or selectively etching a photosensitive glass article which comprises:

(a) forming a design containing cristobalite crystals in a selected area of a photosensitive glass body while leaving the remaining area of the glass unaffected, said glass consisting essentially, in mol percent on the oxide basis, of about 78–85% $SiO_2$, 13–19% $R_2O$, wherein $R_2O$ consists of $Na_2O$, $K_2O$, and mixtures thereof, and 2–5% $F_2$, with at least one photosensitive metal in the indicated proportion in excess of the base glass selected from the group consisting of 0.001–0.01 weight percent Au and 0.001–0.3 weight percent silver computed as AgCl.;

(b) exposing said crystallized design area to a gaseous environment containing at least 50% by weight steam and at a temperature between about 80–200° C. for a period of time sufficient to develop at least a surface portion in said crystallized design area that contains within its volume about 2–15% by weight of water; and then (c) treating said crystallized design portion with a hot aqueous solution to dissolve at least a surface portion of said crystallized design area.

5. A method according to claim 4 wherein the time sufficient to develop said water-containing surface portion is at least about ¼ hour.

6. A method according to claim 4 wherein said hot aqueous solution is water.

7. A method according to claim 4 wherein said hot aqueous solution is an alkaline solution.

References Cited

UNITED STATES PATENTS

| | | | |
|---|---|---|---|
| 2,515,275 | 7/1950 | Stookey | 65—33 |
| 2,515,943 | 7/1950 | Stookey | 65—33 |
| 2,628,160 | 2/1953 | Stookey | 65—31 |
| 2,651,146 | 9/1953 | Stookey | 65—111 |
| 2,684,911 | 7/1954 | Stookey | 65—33 XR |
| 3,275,470 | 9/1966 | Charles | 65—30 XR |

S. LEON BASHORE, Primary Examiner

J. H. HARMAN, Assistant Examiner

U.S. Cl. X.R.

106—52, 74; 65—30, 32, 33